Patented Aug. 14, 1945

2,382,612

UNITED STATES PATENT OFFICE 2,382,612

ESTERIFICATION REACTION PRODUCT AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application March 9, 1943, Serial No. 478,595. Divided and this application September 2, 1943, Serial No. 501,029

7 Claims. (Cl. 260—404)

This invention relates to a new composition of matter, our present application being a division of our parent application, Serial No. 478,595, filed March 9, 1943.

The main object of our invention is to provide a new material or composition of matter, that is particularly adapted for use as a demulsifier in the resolution of crude oil emulsions, but which is capable of use for various other purposes. For instance, the said material may be used as a break inducer in doctor treatment of the kind intended to sweeten gasoline. Certain of the compositions of matter herein described are of value as surface tension depressants in the acidification of calcareous oil-bearing strata by means of strong mineral acid, such as hydrochloric acid. Similarly, some members are effective as surface tension depressants, or wetting agents in the flooding of exhausted oil-bearing strata.

And still another object of our invention is to provide a novel method for producing said new material or composition of matter.

The new material or composition of matter herein described consists of a sub-resinous reaction product derived by reaction involving a non-acidic polybasic carboxy acid derivative, such as diethyl phthalate, diethyl-oxalate, diethyl maleate, diethyl citroconate, diethyl adipeate, diethyl azaleate, diethyl succinate, diethyl tartrate, diethyl citrate, diethyl fumarate, and the like, with the acylated derivatives obtained by reaction between a low molal dialkyl carbonate, particularly diethyl carbonate, and alkanolamines, including the ether type, i. e., such alkanolamines in which a carbon atom chain is interrupted at least once by an oxygen atom. Such alkanolamines may have an alicyclic radical, such as a cyclohexyl radical, an aralkyl radical, or an aryl radical attached to an amino nitrogen atom. In other words, one is not limited to the use of materials such as monoethanolamine, diethanolamine, triethanolamine, monopropanolamine, dipropanolamine, tripropanolamine, monobutanolamine, dibutanolamine, tributanolamine, or ether type derivatives obtained by treating the preceding with ethylene oxide, propylene oxide, glycid, or the like.

As far as we are aware, the acylated derivatives employed as reactants for a combination with diethyl phthalate, or the like, are new chemical compounds or compositions of matter. They are described in detail in our co-pending application for patent Serial No. 478,594, filed March 9, 1943. This application is now Patent No. 2,373,174 allowed April 10, 1945.

For the sake of convenience, much of the following subject-matter is a substantial verbatim repetition of what appears in said co-pending application for patent, for the reason that products therein described are the raw materials or primary materials which result in the ultimate new composition of matter herein contemplated, both as such, for various purposes, and particularly for use as a demulsifier.

Returning then to the manufacture of the acylated derivatives, it is obvious that if desired, one may treat an alkylamine, such as amylamine, octylamine, decylamine, or the like, with one or more moles of ethylene oxide, propylene oxide, or the like, so as to obtain a suitable reactant. The same is true in regard to alicyclic amines, such as cyclohexylamine, or in regard to aralkylamines. It is also true in regard to various arylamines, such as aniline, and the like. It is to be noted that the alkanolamine need not be a tertiary amine, but may be a primary or a secondary amine. Thus, the expression "alkanolamine" is employed in the present instance to indicate that there must be present at least one nitrogen-linked alkanol group, including the type, as previously stated, in which the carbon atom chain is interrupted at least once by an oxygen atom. One may, of course, use polyamino compounds, such as, for example, the products obtained by treating ethylene diamine with ethylene oxide so as to introduce at least 4 hydroxyethyl radicals. The acyl radical may be introduced at any convenient stage, for instance, before the amino-containing reactant has been combined with the low molal dialkyl carbonate, or afterwards. Other low molal carbonates which may be employed include dimethyl ester, methyl ethyl ester, methyl propyl ester, dipropyl ester, dibutyl ester, etc.

The acyl group which is introduced is derived from detergent-forming monocarboxy acids containing 8 carbon atoms or more, and not more than 32 carbon atoms, and are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids.

Instead of naphthenic acids, one might employ brominated naphthenic acids, etc. Acids obtained by the oxidation of petroleum fractions or waxes may be employed. This type of acid may also be subjected to various modifications, provided such modifications still retain detergent-forming properties.

In some instances, more than one type of reaction may take place. For example, there may be a formation of an urethane and an amino ester simultaneously.

In view of what is said hereinafter, it is apparent that the compounds contemplated herein as raw materials for subsequent reaction with diethyl phthalate or the like, may be considered as acylation derivatives of esters of carbamic and carbonic acids, and more particularly, esters containing at least one nitrogen-linked alkanol radical, and in which the acyl radical is that of a detergent-forming monocarboxy acid having at least 8 and not more than 32 carbon atoms.

For the sake of clarity, the following reaction types are presented as illustrating the class of compounds formed. In some instances, they represent intermediate products and are acylated subsequently.

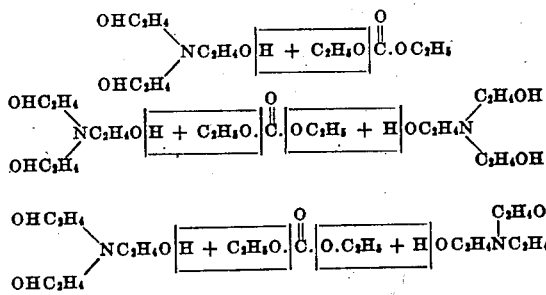

In reactions involving alkanol primary or secondary amines, a more complicated series of reactions may take place. Indeed, in the ordinary course, the result of reaction is a mixture of various products. It is particularly true, when the final acylated product is used as an intermediate for subsequent reaction with a material such as diethyl phthalate, that it is immaterial for many purposes, whether a single resultant is obtained, or a mixture of resultants.

The foregoing is illustrated by considering a very simple aspect, for instance, a reaction involving diethanolamine and diethyl carbonate. At least, three possible reactions suggest themselves immediately:

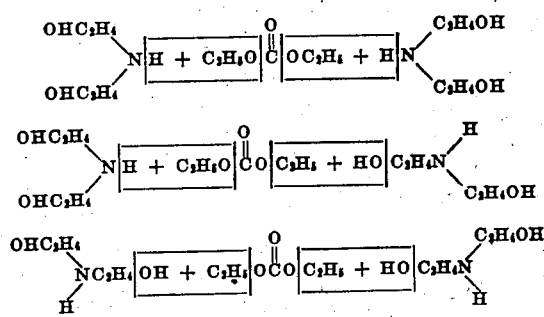

The same reaction as above illustrated will take place in connection with other materials, such as dipropanolamine, dibutanolamine, and also in connection with secondary amines of the type ethyl ethanolamine, ethyl propanolamine, ethyl butanolamine, propyl ethanolamine, propyl propanolamine, cyclohexyl ethanolamine, benzyl ethanolamine, phenyl ethanolamine, etc. This is also true in regard to primary amines such as monoethanolamine, monopropanolamine, monobutanolamine, monopentanolamine, monohexanolamine, etc.

Reconsidering the three reactions immediately preceding, it is obvious that they may be considered as substituted ureas, substituted urethanes, and carbonic acid esters. The urethanes are, of course, esters of carbamic acid. It is also obvious that the products of reaction above described, the esters, urethanes, the substituted ureas, etc., can be treated with ethylene oxide, or some other reagent having a reactive ethylene oxide ring, and subsequently, acylated with a high molal monocarboxy acid. Such acylated product is particularly suitable for reaction with diethyl phthalate, or the like, in order to produce the final composition of matter or demulsifier contemplated in the present instance. In this connection, reference is made to U. S. Patent No. 2,083,221, dated June 8, 1937, to De Groote. Since the products therein contemplated are acylated derivatives of substituted ureas, it is obvious that such type of material is not contemplated in the present instance, although we have discovered that such material of a type contemplated in said aforementioned De Groote patent can be reacted with diethyl phthalate, or the like, to produce more complicated types of materials or chemical compounds which may be used as demulsifiers for water-in-oil emulsions. The following illustrate added examples:

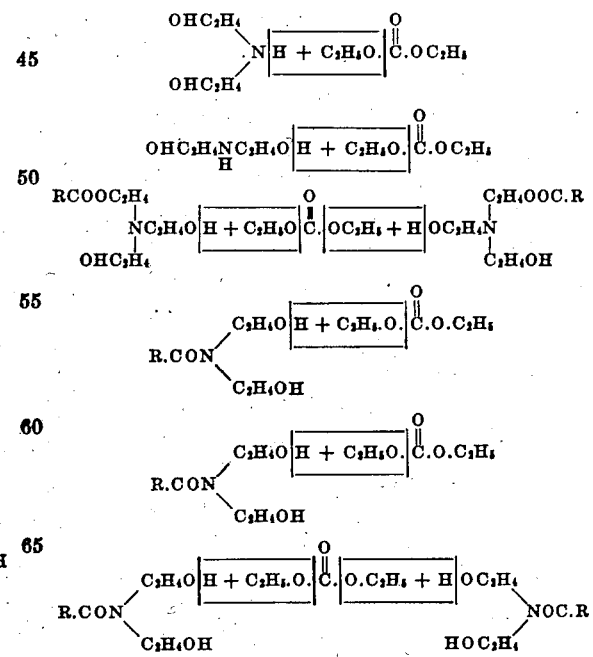

INTERMEDIATE PRODUCT

*Example 1*

Two pound moles of triethanolamine were heated for approximately 6–12 hours, under a reflux condenser with one pound mole of diethyl carbonate. The refluxing temperature was approximately 120. At the end of the reaction period the mixture was subjected to distillation so as to remove the ethyl alcohol formed and any unreacted diethyl carbonate.

INTERMEDIATE PRODUCT
Example 2

The same procedure was followed as in Intermediate product, Example 1, preceding, except that one pound mole of triethanolamine was employed for three pound moles of diethyl carbonate.

INTERMEDIATE PRODUCT
Example 3

The product obtained in Intermediate product, Example 2, preceding, was heated further until the resultant mass represented a more viscous material than in preceding example.

INTERMEDIATE PRODUCT
Example 4

Triethanolamine, which had been treated with ethylene oxide in the ratio of three moles of ethylene oxide for one mole of triethanolamine, was substituted as the tertiary amine in the preceding examples.

INTERMEDIATE PRODUCT
Example 5

Tri-isopropanolamine was substituted for triethanolamine in the preceding examples.

INTERMEDIATE PRODUCT
Example 6

Two pound moles of diethanolamine were reacted with one pound mole of diethyl carbonate in the same manner as described in Intermediate product, Example 1, preceding. Analysis indicated that the final product contained approximately 50% of an urethane or a substituted urea and 50% of an aminoester.

INTERMEDIATE PRODUCT
Example 7

Two pound moles of hydroxyethyl ethylene diamine were reacted with one pound mole of diethyl carbonate in the manner described under Intermediate product, Example 1, preceding.

INTERMEDIATE PRODUCT
Example 8

The same procedure was followed as in the preceding example, except that tetraethanol tetraethylene pentamine was substituted in place of hydroxyethyl ethylene diamine.

INTERMEDIATE PRODUCT
Example 9

One pound mole of hydroxyethyl ethylene diamine was treated with three to five pound moles of ethylene oxide, so as to convert all amino hydrogen atoms to hydroxyethyl radicals. The product so obtained was substituted for hydroxyethyl ethylene diamine in Example 7, preceding.

INTERMEDIATE PRODUCT
Example 10

Tris(hydroxymethyl) aminomethane was substituted for triethanolamine in Intermediate product, Example 1, preceding. When this reactant was used, the yield was considerably less than with previous examples, especially those in which triethanolamine was reported. Approximately ½% of sodium bicarbonate was added as a catalyst during the reaction.

In the manufacture of any compound involving diethyl carbonate, it is obvious that care must be taken that the diethyl carbonate or some other similar carbonate such as dipropyl carbonate, is not decomposed by the presence of an acidic reagent under conditions which would tend towards liberating carbon dioxide. It is not always possible to predict the stability of the more complex carbonates or derivatives of the kind which have been described and illustrated by the examples of Intermediate products immediately preceding. Indeed, it is not always possible to predict the stability of diethyl carbonate towards aqueous acids, even at normal room temperature. The best test in any instance is an actual laboratory experiment to determine whether or not decomposition and liberation of carbon dioxide takes place. For these reasons, subsequent acylation of intermediate products of the kind previously described is best conducted by a non-acidic fatty acid derivative, rather than the fatty acid derivative itself. In other words, if one attempts to acylate materials of the kind previously described by means of oleic acid, ricinoleic acid, abietic acid, naphthenic acid, or the like, one finds that decomposition takes place, under conditions required to give the desired resultant. One suitable procedure is to resort to a functional equivalent of the acid, such as an ester or amide. This means that for practical purposes it is most convenient to use the higher fatty acids as a source of the high molal monocarboxy detergent-forming radical, for the reason that such acids are available in the form of an ester, i. e., the glyceride. In other instances, and especially when the reaction takes place at a decidedly lower temperature, one may employ a low molal monohydric alcohol ester of the detergent-forming acid, such as a methyl ester, an ethyl ester, or a propyl ester of the fatty acid or detergent-forming acid. In other words, ethyl ricinoleate, ethyl oleate, ethyl naphthenate, ethyl abietate, etc. are particularly desirable reactants. The methyl esters and propyl esters are also desirable. The corresponding amides derived by reaction between one mole of the acids and ammonia, may also be used with the subsequent liberation of ammonia during the reaction. What has been said in this connection is readily illustrated by subsequent examples.

Another procedure to obviate such difficulties of decomposition has already been suggested by the formulas or reactions previously presented. One solution resides in introducing the acyl radical of the high molal detergent-forming acid into the desired amino molecule or compound prior to reaction with diethyl carbonate or its equivalent. For instance, it is well known that any of the monocarboxy detergent-forming acids of the kind herein contemplated as such, or in any equivalent form, including the acyl chloride, amide or acid, can be reacted with a variety of primary or secondary amines containing an alkanol radical, such as monoethanolamine, diethanolamine, monopropanolamine, dipropanolamine, tris (hydroxymethyl) aminomethane, or the like, to produce amides in which there is present at least one amino radical. Other suitable reactants of this type include ethylethanolamine, cyclohexylethanolamine, phenylethanolamine, benzylethanolamine, and the like. The manufacture of such amides is well known and requires no further elaboration, although some subsequent examples may illustrate the formation of such amides by the oxyalkylation of an amide.

In regard to the acylated aminoalcohols used as reactants, one type, a monoamino type, is described in U. S. Patent No. 2,225,824, dated December 24, 1940, to De Groote and Wirtel. Said patent described in detail the manufacture of compounds of the following formula:

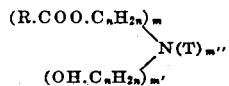

in which R.COO represents the oxyacyl radical derived from a monobasic detergent-forming acid; T represents a hydrogen atom or a non-hydroxy hydrocarbon radical, or the acylated radical obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2 or 3; $m'$ represents the numeral 0, 1 or 2; and $m''$ represents the numeral 0, 1 or 2, with the proviso that $m+m'+m''$ equals 3.

A similar type of compound, which contains an ether linkage, is described in U. S. Patent No. 2,259,704, dated October 21, 1941, to Monson and Anderson. In said patent there is a description of acylated aminoethers containing:

(a) A radical derived from a basic hydroxyaminoether, and said radical being of the kind containing at least one amino nitrogen free from attached aryl and amido-linked acyl radicals; said hydroxyaminoether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyaminoether radical being characterized by containing not over 60 carbon atoms; and (b) An acyl radical derived from a detergent-forming monocarboxy acid having at least 8 carbon atoms and not more than 32 carbon atoms; said acylated aminoether being additionally characterized by the fact that said aforementioned acyl radical is a substituent for a hydrogen atom of an alcoholic hydroxy radical.

Although primarily, raw materials, such as triethanolamine, ethyldiethanolamine, and the like, are most frequently employed in the manufacture of the acylated amino-alcohol, it is understood that such materials may be reacted with an oxyethylating agent, such as ethylene oxide, propylene oxide, or the like, to produce comparable materials which also are well known compounds. (See also U. S. Patents Nos. 2,228,986, 7, 8, and 9, all dated January 4, 1941, to De Groote, Keiser and Blair.) If desired, the acylated amino-alcohols of the kind previously described may be subjected to a subsequent oxyalkylation step, i. e., treatment with ethylene oxide or the like. For example, the ester derived from ricinoleic acid and triethanolamine could be subjected to treatment with ethylene oxide, propylene oxide, or the like. As has been previously pointed out, such acylated amino-alcohols containing at least one basic amino nitrogen atom, need not be obtained from monoamines, or monoaminoalcohols, but may, in fact, be obtained from polyaminoalcohols. Thus, hydroxyethyl ethylenediamine may be treated with three moles of ethylene oxide, so as to obtain tetra(hydroxyethyl) ethylenediamine. Such product can be readily acylated with a high molal detergent-forming acid. Similarly, diethylenetriamine can be treated with four moles of ethylene oxide, so as to yield a tetrasubstituted product. The compound obtained can be acylated with two moles of a suitably selected detergent-forming acid, for example, a higher fatty acid, to give a suitable acylated aminoalcohol having at least two basic nitrogen atoms. Furthermore, in the broadest aspect, one is not limited to acylated derivatives in which the acyloxy radical of the detergent-forming acid enters into the aminoalcohol, but one may employ compounds in which the acyl group, as distinguished from the acyloxy group, is introduced into the amino reactant. For example, ethylenediamine, or diethylenetriamine, may be treated with a detergent-forming monocarboxy acid, so as to yield the acylated polyamine. Such polyamine can then be treated with ethylene oxide or the like, so as to convert it into an aminoalcohol. Insofar that there are two or more amino nitrogen atoms present, obviously, there must be at least one basic nitrogen atom, provided that only partial amidification has been employed.

As to the hydroxylated high molal amides, one is concerned with the type of material which may be obtained as the oxyalkylation derivative of the corresponding amide or substituted amide. For instance, any high molal acid or its equivalent may be reacted with ammonia or the like to produce an amide by conventional procedure. However, amides, instead of being obtained from ammonia, may be obtained from primary amines, such as amines in which a hydrogen atom linked to a nitrogen atom has been replaced by an alkyl radical, an aralkyl radical, an alicyclic radical, an alkylol radical, or the type of radical in which the carbon chain has been interrupted at least once by an oxygen atom. Examples of such amines are amylamine, cyclohexylamine, benzylamine, monoethanolamine, tris(hydroxymethyl)aminomethane, etc. Polyamino types may also be employed, such as ethylenediamine, bis(hydroxyethyl)ethylenediamine, etc. If one starts with ammonia, or an amine free from a hydroxylated radical, it is obvious that the amides so obtained, for instance, oleoamide, ricinoleoamide, amyloleoamide, amylricinoleoamide, or the like, can be treated with one or more moles of an oxyethylating agent, such as ethyleneoxide, propyleneoxide, butyleneoxide, glycid, or the like, to give a high molal substituted amide having at least one monocarboxy detergent-forming acid acyl radical and at least one hydroxylated hydrocarbon group, or the equivalent, wherein the carbon atom chain is interrupted at least once by oxygen. The amine need not be basic, and thus aniline, phenylethanolamine, or the like may also be employed as a primary reactant. Obviously, however, amides can be obtained as conveniently from a fatty acid, for example, and monoethanolamine, as would be possible by first reacting the fatty acid or its equivalent, such as the ester, with ammonia, and then subjecting the unsubstituted amide to oxyethylation. The production of such amides, and, as a matter of fact, polyamides derived from suitable polyamines is well known and requires no further elaboration. The presence of a basic nitrogen atom, i. e., a nitrogen atom not directly linked to either an aryl group, or an acyl radical, is not objectionable, and may be desirable. For instance, one might react hydroxyethyl ethylenediamine with ricinoleic acid, so as to introduce the acyl radical, as distinguished from the acyloxy radical. It is to be noted that some of the high molal substituted amides are polyfunctional, in that two or more hydroxy hydrocarbon radicals, or their equivalents, are introduced. Furthermore, there is no objection to using the oxyethylating agent in substantial multiple proportions, i. e., there is no objection to introducing an ether linkage which recurs a number of times.

BASIC ACYLATED AMINOALCOHOLS

*Example 1*

Ricinoleic acid is reacted with triethanolamine in the conventional manner to give a compound of the following formula:

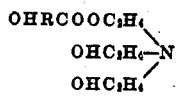

BASIC ACYLATED AMINOALCOHOLS

*Example 2*

The same procedure is followed as in the preceding example, except that the triethanolamine is treated with three moles of ethylene oxide prior to acylation with ricinoleic acid.

BASIC ACYLATED AMINOALCOHOLS

*Example 3*

Ethyldiethanolamine is substituted for triethanolamine in Examples 1 and 2, preceding.

BASIC ACYLATED AMINOALCOHOLS

*Example 4*

Tri-isopropanolamine or propyl di-isopropanolamine is employed, following the same procedure as described in Examples 1 to 3, preceding.

BASIC ACYLATED AMINOALCOHOLS

*Example 5*

Hydroxyethyl ethylenediamine is reacted with three moles of ethylene oxide and then with one mole of ricinoleic acid, so as to give a compound of the following composition:

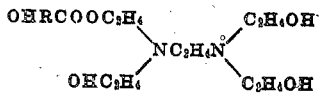

BASIC ACYLATED AMINOALCOHOLS

*Examples 6*

Diethylenetriamine is treated with four moles of ethylene oxide and then with two moles of ricinoleic acid.

The compounds described in the preceding examples are well known compositions and the method of preparation is well known.

HYDROXYLATED SUBSTITUTED HIGH MOLAL AMIDES

*Example 1*

One pound mole of ricinoleic acid is reacted with one pound mole of monoethanolamine to give the corresponding amide.

HYDROXYLATED SUBSTITUTED HIGH MOLAL AMIDES

*Example 2*

One pound mole of ricinoleic acid is reacted with one pound mole of diethanolamine to give the corresponding amide.

HYDROXYLATED SUBSTITUTED HIGH MOLAL AMIDES

*Example 3*

One pound mole of ricinoleic acid is reacted with one pound mole of 2-amino-2-methyl-1,3-propanediol to give the corresponding amide.

HYDROXYLATED SUBSTITUTED HIGH MOLAL AMIDES

*Example 4*

One pound mole of ricinoleic acid is reacted with one pound mole of 2-amino-2-ethyl-1,3-propanediol to give the corresponding amide.

HYDROXYLATED SUBSTITUTED HIGH MOLAL AMIDES

*Example 5*

One pound mole of ricinoleic acid is reacted with one pound mole of tris(hydroxymethyl)aminomethane to give the corresponding amide.

HYDROXYLATED SUBSTITUTED HIGH MOLAL AMIDES

*Example 6*

One pound mole of ricinoleic acid is reacted with one pound mole of hydroxyethyl ethylenediamine to give the corresponding amide.

HYDROXYLATED SUBSTITUTED HIGH MOLAL AMIDES

*Example 7*

One pound mole of diethylenetriamine is reacted with one pound mole of ricinoleic acid to give the corresponding amide, which is then reacted with one pound mole of ethylene oxide to give the corresponding hydroxyethylamide.

Returning now to consideration of acylated products by reaction involving reactants exemplified by Intermediate product Examples 1 to 10, and of the kind employed by reaction with diethyl phthalate to give the final composition of matter herein contemplate and particularly for use as a demulsifier, one need only consider a few specific examples, such as the following, which illustrate procedure so that more elaborate description is unnecessary:

ACYLATED PRODUCT

*Example 1*

Three pound moles of a material of the kind described under Intermediate product, Example 1, preceding, was heated for approximately 2 hours at 200° C. with one pound mole of triricinolein.

ACYLATED PRODUCT

*Example 2*

The same procedure was followed as in Acylated product, Example 1, preceding, but instead of using Intermediate product, Example 1, preceding, there was substituted various other intermediate products, as described under the heading "Intermediate product, Example 2" to "Intermediate product, Example 10," inclusive.

ACYLATED PRODUCT

*Example 3*

In view of the composition of some of the products described under "Intermediate products, Examples 2 to 10," preceding, it is obvious that more than one acyl radical could be introduced. For instance, three pound moles of an intermediate product of the kind exemplified by Intermediate product, Example 1, was reacted with two pound moles of triricinolein, so as to yield a polyacylated product.

ACYLATED PRODUCT

Example 4

Two pound moles of ethanol ricinoleoamide obtained by reaction between ricinoleic acid and ethanolamine, were heated with one pound mole of diethyl carbonate. (See Hydroxylated substituted high molal amide, Example 1.) The reaction was conducted in the presence of ½% sodium bicarbonate as a catalyst. The material was refluxed at approximately 120° C. for 8 hours, and then the distillate removed in the customary manner.

ACYLATED PRODUCT

Example 5

Diethanolricinoleoamide derived by reaction between ricinoleic acid and diethanolamine was substituted for ethanol ricinoleoamide in the preceding example. (See Hydroxylated substituted high molal amide, Example 2.) Approximately ½% of sodium bicarbonate was added as a catalyst during the reaction.

ACYLATED PRODUCT

Example 6

The amide derived by reaction between ricinoleic acid and tris(hydroxymethyl)aminomethane was substituted for diethanol ricinoleoamide in the preceding example. (See Hydroxylated substituted high molal amide, Example 5). Approximately ½% of sodium bicarbonate was added as a catalyst during the reaction.

As to the preparation of the desired new compositions of matter or demulsifying agents by reactions involving diethyl carbonate or its equivalent, and an acylated amino alcohol, reference is made to the following examples:

ACYLATED PRODUCT

Example 7

Two pound moles of a type of material exemplified by Basic acylated amino alcohols, Example 1, is reacted with one pound mole of diethyl carbonate. The reaction is conducted in the presence of one-half of 1% of sodium bicarbonate as a catalyst. The material is refluxed at approximately 120° C. for 8 hours, and the distillate then removed in the customary manner.

ACYLATED PRODUCT

Example 8

Two pound moles of materials exemplified by Basic acylated amino alcohols, Example 2, are reacted with one pound mole of diethyl carbonate in the same manner as preceding Example 7.

ACYLATED PRODUCT

Example 9

Two pound moles of material of the kind exemplified by Basic acylated amino alcohols, Examples 3 to 6, inclusive, are reacted with one pound mole of diethyl carbonate in the same manner as in Example 7, immediately preceding.

As has been previously pointed out, any of the high molal monocarboxy detergent-forming acid compounds may be employed to introduce the acyl group indicated by the radical RCO. It is our preference, however, to use fatty acid compounds as the source of such high molal acyl radical. Such acid compounds are commonly referred to as higher fatty acid compounds. We prefer to use fatty acid compounds derived from acids having 18 carbon atoms, and more especially, unsaturated fatty acid compounds. We particularly prefer to use compounds obtained from oleic acid, ricinoleic acid, linoleic acid, linolenic acid, etc. We have found that the mixture of fatty acids obtained from soyabean oil, peanut oil, teaseed oil, linseed oil, corn oil, cottonseed oil, and the like, would be particularly desirable, after conversion into suitable compounds.

Attention is again directed to the fact that instead of using reactants of the kind described, one may use reactants in which alkyl radicals, aralkyl radicals, or alicyclic radicals may be present. It has been previously pointed out that such reactants are readily available by the oxyalkylation, particularly the oxyethylation of naphthylamine, aniline, cyclohexylamine, ethyl cyclohexylamine, dicyclohexylamine, benzylamine, ethyl benzylamine, etc.

In summary, then, what has been said previously is a complete and adequate description of methods and procedures for producing acylated esters selected from the class consisting of carbamic and carbonic acid esters; said esters containing at least one nitrogen-linked alkanol radical; the acyl radical being that of a detergent-forming monocarboxy acid having at least 8 and not more than 32 carbon atoms; with the proviso that said acylated ester is free from a diamido linkage, in which two amido nitrogen atoms are linked to the same carbonyl carbon atom.

Re-examination of the type of compounds above described reveals that they are readily susceptible to acylation, by virtue of the presence of at least one amino nitrogen atom, or at least, one alcoholic hydroxyl group, or by the presence of both such functions. Reactions involving an amino hydrogen atom result in the formation of an amide or substituted amide, i. e., a compound in which an acyl radical is directly linked to an amino nitrogen atom. Reactions involving the alcoholic hydroxyl radical results in esterification, i. e., the introduction of the acyloxy radical, or, more commonly, the acid radical. In such instances where the acylated ester or carbamic or carbonic acid compounds have only one reactive function, i. e., only one alcoholic hydroxyl, or only one amino hydrogen atom, it is obvious that only monoamines can result, in that resinification cannot take place. One may obtain compounds in which one alkyl radical of alkyl diphthalate, or its equivalent, is replaced by a radical obtained from the more complex reactant above described, or one may obtain a resultant in which both alkyl radicals of diethyl phthalate, or an equivalent reactant, have been replaced by residues or radicals from the more complex reactants above described.

Referring to the various acylated derivatives suitable for reaction with diethyl phthalate or the like, and particularly when such acylated radicals have been obtained by the introduction of a hydroxylated high molal monocarboxy acid radical, such as the acyl radical derived from ricinoleic acid, polyricinoleic acid, hydroxystearic acid, dihydroxystearic acid, or the like, it becomes apparent, in the light of the theory of polyfunctionality, that resinification will take place in numerous instances. The compositions of matter herein contemplated for various purposes, and particularly for use as demulsifiers, is limited to the type which is sub-resinous.

COMPOSITION OF MATTER

Example 1

One pound mole of a material of the kind exemplified by Acylated product, Example 1, is reacted with two pound moles of diethyl phthalate by heating, with constant stirring, at 190-230° C. until substantially 2 pound moles of ethyl alcohol have been removed.

COMPOSITION OF MATTER
Example 2

The same procedure is followed as in Composition of matter, Example 1, preceding, but instead of using a material of the kind exemplified by Acylated product, Example 1, there is substituted instead various other products of the kind described under headings entitled "Acylated products, Examples 2-10," inclusive.

COMPOSITION OF MATTER
Example 3

The same procedure is followed as in the two preceding examples, except that diethyl succinate is substituted for diethyl phthalate.

COMPOSITION OF MATTER
Example 4

The same procedure is followed as in Examples 1 and 2, preceding, except that diethyl adipeate is substituted for diethyl phthalate.

COMPOSITION OF MATTER
Example 5

The same procedure is followed as in Examples 1 and 2, preceding, except that diethyl maleate is substituted for diethyl phthalate.

COMPOSITION OF MATTER
Example 6

The same procedure is followed as in Examples 1 and 2, preceding, except that diethyl citroconate is substituted for diethyl phthalate.

COMPOSITION OF MATTER
Example 7

The same procedure is followed as in Examples 1 and 2, preceding, except that diethyl sebacate is substituted for diethyl phthalate.

COMPOSITION OF MATTER
Example 8

The same procedure is followed as in Examples 1 and 2, preceding, except that diethyl azaleate is substituted for diethyl phthalate.

COMPOSITION OF MATTER
Example 9

The same procedure is followed, as in preceding Examples 1 to 8, except that other low molal esters, such as the dipropyl ester, dimethyl ester, dibutyl ester, or mixed esters, such as ethyl propyl, ethyl butyl propyl, is substituted for diethyl esters as reactants in the preceding procedures.

It is understood that various polybasic acids, and particularly in the form of other low molal diethyl alkyl esters, may be employed. One may use tribasic acids, as well as dibasic acids. Other suitable acids include citric, tartaric, fumaric, oxalic, etc.

We have found that the most suitable products for various purposes, and particularly for demulsification, are sub-resinous, semi-resinous, or balsam-like products, and are preferably derived from polyfunctional acylated reactants, in which the acyl group is derived from a high molal detergent-forming monocarboxy acid. We have found that such products are soluble to a fairly definite state, for example, 5% in some solvent, such as water, alcohol, benzene, dichloroethyl ether, acetone, cresylic acid, dilute acetic acid, dioxane, or the like. This is simply another way of stating that it is preferable, that the product be one of the sub-resins, which are commonly referred to as an A resin, or a B resin, as distinguished from a C resin, which is a highly infusible, insoluble resin. (See Ellis, "Chemistry of Synthetic Resins," 1935, page 862, et seq.)

It is our preference that the products be obtained from polyhydroxylated acylated products by reaction with diethyl phthalate, or the like. Indeed, it is our preference to employ polyhydroxylated, acylated products of the kind in which there is no amino hydrogen atom present, i. e., the kind in which acylation is limited entirely to the esterification type of reaction. Note, for example, basic acylated amino alcohols, Example 5, portrayed previously.

In view of what has been said as to this more narrow and preferred aspect of the present invention, it is apparent that a monohydroxylated acylated product free from an amino hydrogen atom, can form only a monomer such as a complete ester or fractional ester. Thus, the hydroxylated acylated products employed as reactants for combination with diethyl phthalate, or the like, may be considered as an alcohol, i. e., a monohydric or polyhydric alcohol. If an alcohol is indicated by the formula $Y'(OH)_n$, in which $Y'$ represents the alcoholic radical, exclusive of the hydroxyl group or groups, where $n$ indicates the number 1 or more, and if a polybasic acid body be indicated by the formula $X'(COOH)_n$, in which $X'$ represents the acid radical, exclusive of the carboxyl group or groups, where $n$ indicates the number 2 or more, then the reaction between a monohydric alcohol and a polybasic acid will result in a compound which may be indicated by the following formula: $YX(COOH)_{n'}$, in which $YX$ represents the ester radical, exclusive of the carboxyl group or groups, wherein $n'$ indicates the number 1 or more, and which is in reality a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed a diphthalate of a polyhydroxylated ester diamide of the kind previously described, then examination reveals that the formula might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals; or there might be both. This is indicated by the following:

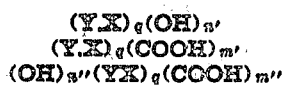

in which $YX$, as previously, represents an ester radical, and more particularly, a fractional ester radical, exclusive of the hydroxyl group or groups, and exclusive of the carboxyl group or groups and in which $q$ indicates a small whole number (one in the case of a monomer, and probably not over 10, and usually less than 5, and $m'$ and $n'$ indicate the number 1 or more, and $m''$ and $n''$ indicate zero or a small or moderately sized whole number, such as zero, one or more, but in any event, probably a number not in excess of 4-8.

Actually, in view of what has been said as to the most desirable procedure of manufacture, in order to avoid decomposition, it is obvious that the free carboxyl atom above will not appear, but the ester radical, i. e., one where the carboxylic hydrogen atom has been replaced by a methyl, ethyl, propyl, or butyl group, will appear.

It is also obvious that the solubility of the reagents herein described may be enhanced by oxyalkylation, i. e., the final composition of matter—exemplified by Examples 1 to 9, preceding, may, in various instances, be subjected to treatment with a reagent containing a reactive ethylene oxide ring, for example, ethylene oxide, propylene oxide, butylene oxide, glycid, etc. In such instances, the ethylene oxide or equivalent reactant reacts with any amino hydrogen atom present, or any hydroxyl radical present, or may cause a rearrangement or re-esterification by replacing a low mole alkyl radical, such as an ethyl radical, by a hydroxyethyl radical, or an equivalent radical, in which the carbon atom chain is interrupted one or more times by an oxygen atom. Compare reactions involved when a glyceride such as a castor oil or olive oil is treated with ethylene oxide.

In addition to the various uses previously enumerated, the new compounds herein described are capable of use for the removal of the residual mud sheath of a well drilled by the rotary method. Said new compounds are also adapted for various uses where wetting agents of the conventional type are used. As to some of such uses, which are well known, see "The expanding application of wetting agents," "Chemical Industries," volume 48, page 324 (1941).

The words "acidyl" and "acyl" and the words "acidylation" and "acylation" are usually used synonymously. Compounds of the type herein contemplated, and particularly for use as demulsifiers, are characterized by having two different types of carboxylic acid radicals, or carboxylic acyl radicals present. One type is derived from high molal detergent-forming monocarboxy acids, such as higher fatty acids, and the other type is derived from polybasic acids, particularly phthalic acid, and the like, or other suitable derivatives thereof, such as diethyl phthalate. For purposes of clarity, in the hereto attached claims, the use of the words "acyl," "acylated" and "acylation" is limited to high molal monocarboxy detergent-forming acids, whereas, the expressions "acidyl," "acidylated" and "acidylation" are used in connection with polybasic carboxy acids.

Having thus described our invention, what we claim as new and desire to secure by Letters Patent is:

1. The non-volatile resultant of an esterification reaction between (A) a monocarboxy acid ester; in said ester, the acyl radical RCO of the monocarboxy acid RCOOH is that of a detergent-forming acid having at least 8 and not more than 32 carbon atoms and is the substituent for at least one alcoholic hydroxyl hydrogen atom of an alcohol, which alcohol is in turn a hydroxylated amino ester of the formula:

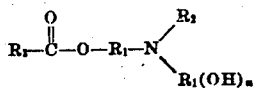

in which $R_1$ is an alkylene radical having not more than 4 carbon atoms in the alkylene group; $R_2$ is a member of the class consisting of $R_1(OH)_n$ radicals, and monovalent hydrocarbon radicals having not over 10 carbon atoms; $R_3$ is a member of the class consisting of

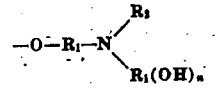

radicals; $OR_4$ radicals, where $R_4$ is an alkyl radical having not more than 4 carbon atoms and

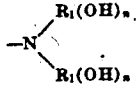

radicals; and in all instances, $n$ being a small whole number; and (B) a low molal alkyl ester of a polycarboxy acid, in which the alkyl group has less than 5 carbon atoms; said esterification reaction between (A) and (B) eliminating as the volatile resultant, the particular alcohol corresponding to the alkyl radical of the polycarboxy acid ester.

2. The non-volatile resultant of an esterification reaction between (A) a monocarboxy acid ester; in said ester, the acyl radical RCO of the monocarboxy acid RCOOH is that of a detergent-forming acid having at least 8 and not more than 32 carbon atoms and is the substituent for at least one alcoholic hydroxyl hydrogen atom of an alcohol, which alcohol is in turn a hydroxylated amino ester of the formula:

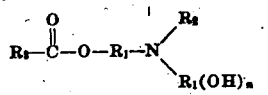

in which $R_1$ is an alkylene radical having not more than 4 carbon atoms in the alkylene group; $R_2$ is a member of the class consisting of $R_1(OH)_n$ radicals, and monovalent hydrocarbon radicals having not over 10 carbon atoms; $R_3$ is a member of the class consisting of

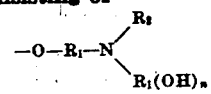

radicals, $OR_4$ radicals, where $R_4$ is an alkyl radical having not more than 4 carbon atoms and

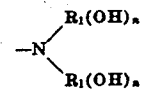

radicals; and in all instances, $n$ being a small whole number; and (B) a low molal alkyl ester of a dicarboxy acid, in which the alkyl group has less than 5 carbon atoms; said esterification reaction between (A) and (B) eliminating as the volatile resultant, the particular alcohol corresponding to the alkyl radical of the dicarboxy acid ester.

3. The ester of claim 1, wherein RCO is the acyl radical of an unsaturated higher fatty acid, and $R_2$ is an $R_1(OH)_n$ radical, and $R_3$ is an

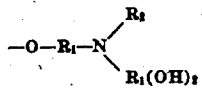

radical, all occurrences of $R_1$ being ethylene radicals, and $n$ being one.

4. The ester of claim 1, wherein RCO is a ricinoleyl radical and $R_2$ is an $R_1(OH)_n$ radical, and $R_3$ is an

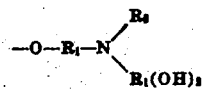

being ethylene radicals, and $n$ being one.

5. The ester of claim 1, wherein RCO is an oleyl radical, and R₂ is an R₁(OH)ₙ radical, and R₃ is an

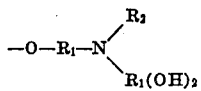

radical, all occurrences of R₁ being ethylene radicals, and $n$ being one.

6. The ester of claim 1, wherein RCO is a linoleyl radical and R₂ is an R₁(OH)ₙ radical, and R₃ is an

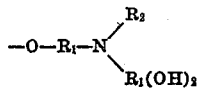

radical, all occurrences of R₁ being ethylene radicals, and $n$ being one.

7. In the manufacture of sub-resinous acidylation derivatives, as described in claim 1, the steps of reacting a low molal dialkyl carbonate with a tertiary alkylolamine, and subsequently acylating the preceding resultant with a high molal monocarboxy detergent-forming acid compound, in which the acyl radical contains at least 8 and not more than 32 carbon atoms, and thereafter reacting said intermediate acylated ester with a low molal dialkyl ester of a polybasic acid, with the elimination of a low molal volatile alkyl alcohol.

MELVIN DE GROOTE.
BERNHARD KEISER.